(12) United States Patent
Fischer et al.

(10) Patent No.: US 10,703,344 B2
(45) Date of Patent: Jul. 7, 2020

(54) WHEEL GUIDE RAIL AND VEHICLE TREATMENT INSTALLATION

(71) Applicant: WASHTEC HOLDING GMBH, Augsburg (DE)

(72) Inventors: Ronald Fischer, Augsburg (DE); Michael Braunbarth, Kaufering (DE); Richard Kircheis, Augsburg (DE)

(73) Assignee: WASHTEC HOLDING GMBH, Augsburg (DE)

( * ) Notice: Subject to any disclaimer, the term of this patent is extended or adjusted under 35 U.S.C. 154(b) by 257 days.

(21) Appl. No.: 15/534,645

(22) PCT Filed: Oct. 7, 2016

(86) PCT No.: PCT/EP2016/074012
§ 371 (c)(1),
(2) Date: Jun. 9, 2017

(87) PCT Pub. No.: WO2017/060435
PCT Pub. Date: Apr. 13, 2017

(65) Prior Publication Data
US 2018/0257610 A1    Sep. 13, 2018

(30) Foreign Application Priority Data
Oct. 8, 2015    (DE) .................. 10 2015 012 967

(51) Int. Cl.
| | |
|---|---|
| *B60S 3/00* | (2006.01) |
| *B60S 3/06* | (2006.01) |
| *F21S 8/00* | (2006.01) |
| *F21V 23/06* | (2006.01) |
| *F21V 31/00* | (2006.01) |
| *F21W 111/02* | (2006.01) |

(52) U.S. Cl.
CPC ............... *B60S 3/004* (2013.01); *B60S 3/06* (2013.01); *F21S 8/032* (2013.01); *F21V 23/06* (2013.01); *F21V 31/005* (2013.01); *F21W 2111/02* (2013.01)

(58) Field of Classification Search
CPC .. B60S 3/004; B60S 3/06; F21S 8/032; F21V 23/06; F21V 31/005; F21W 2111/02
USPC ............................................. 134/123
See application file for complete search history.

(56) References Cited

U.S. PATENT DOCUMENTS 8,421,650 B2    4/2013  Wimmer

FOREIGN PATENT DOCUMENTS

| CN | 101980904 A | 2/2011 |
| CN | 103672474 A | 3/2014 |

(Continued)

OTHER PUBLICATIONS

DE202012103410U1—machine translation (Year: 2013).*
(Continued)

*Primary Examiner* — Tinsae B Ayalew
(74) *Attorney, Agent, or Firm* — Paul D. Bianco; Gary S. Winer; Fleit Intellectual Property Law

(57) ABSTRACT

A wheel guide rail for lateral delimitation of a washing area of a vehicle treatment installation has an elongated housing and several light modules distributed along the housing. The housing has several openings distributed over its length. Each light module includes a mounting base mounted in one of the openings of housing and at least one light source mounted in the mounting base.

20 Claims, 3 Drawing Sheets

(56) References Cited

FOREIGN PATENT DOCUMENTS

| | | |
|---|---|---|
| CN | 104315393 A | 1/2015 |
| DE | 10 2008 034 571 A1 | 2/2010 |
| DE | 20 2012 103 410 U1 | 3/2014 |

OTHER PUBLICATIONS

English translation of International Preliminary Report on Patentability dated May 1, 2018 for PCT/EP2016/074012, filed Oct. 7, 2016.
English translation of Written Opinion for PCT/EP2016/074012 filed Oct. 7, 2016.
International Search Report dated Dec. 5, 2016 for PCT/EP2016/074012, filed Oct. 7, 2016.
Written Opinion for PCT/EP2016/074012, filed Oct. 7, 2016.
Office Action for Chinese Patent Application No. 201620003500.8, dated Dec. 4, 2018 (with English translation).

\* cited by examiner

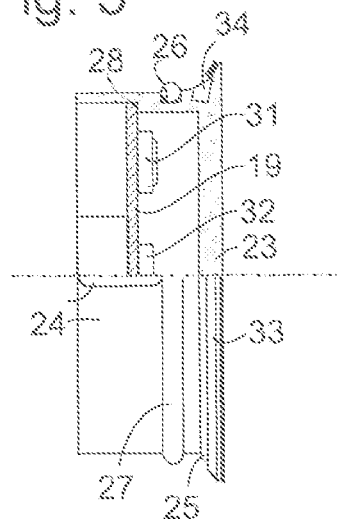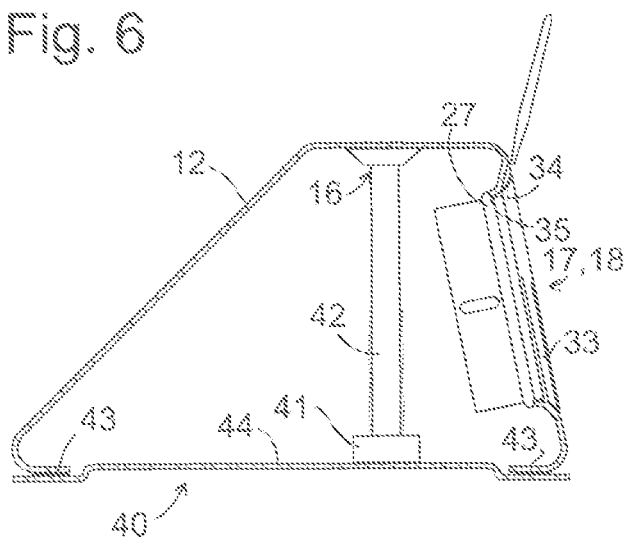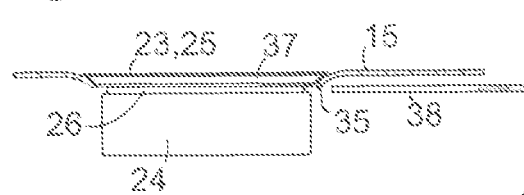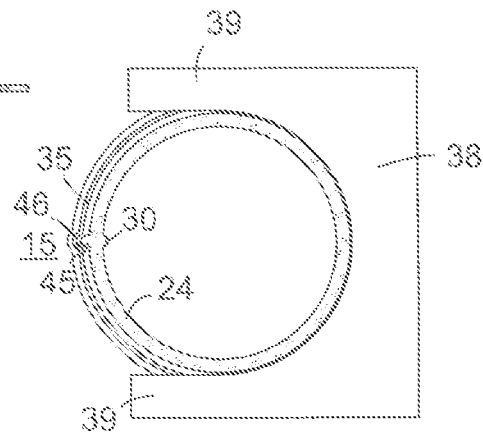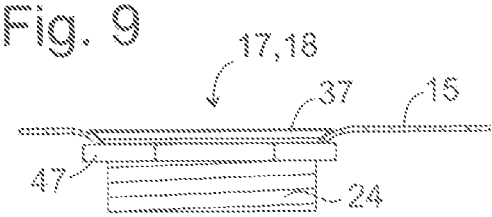

WHEEL GUIDE RAIL AND VEHICLE TREATMENT INSTALLATION

FIELD OF THE INVENTION

The invention concerns a wheel guide rail for a vehicle treatment installation, as well as a vehicle treatment installation.

BACKGROUND OF THE INVENTION

DE 20 2012 103 410 U1 discloses an illumination device in which a number of light elements arranged in a row are arranged commonly on an elongated support arranged on a guide rail. This has the drawback that all undamaged light elements, together with the elongated support, must always be replaced when one of the light elements fails, which requires demanding installation work. Replacement of individual light elements, which are energy-saving or have other illumination functions, is also demanding even when the light elements are functioning.

SUMMARY OF THE INVENTION

One aspect of the present invention is therefore to overcome the aforementioned drawbacks and provide a wheel guide rail and a vehicle treatment installation that permits illumination of the vehicle treatment installation more suitable for maintenance.

Accordingly, a wheel guide rail and a vehicle treatment installation are disclosed herein. Advantageous embodiments and expedient modifications are also disclosed.

This problem is solved by the invention by a wheel guide rail with the features of claim 1 and a vehicle treatment installation with the features of claim 16. Advantageous embodiments and expedient modifications of the inventions are stated in the dependent claims.

The wheel guide rail according to the invention is characterized by the fact that its housing has several openings distributed over its length and that several light modules are provided, each of which includes a mounting base mounted in one of the openings of the housing and at least one light source mounted in the mounting base.

The mounting bases are preferably designed cup-like with a bottom and a peripheral wall, which delimit a recess opened toward the interior of the housing in which the light source is accommodated, protected by the bottom from the cleaning liquids used in the vehicle treatment installation. The bottom should then be transparent for light of the light source.

In order to minimize the hazard of damage to the light modules, especially its mounting base, by contact with the tires of a vehicle, the bottom should be flush with a flank of the housing in which the openings are formed or recessed into the housing behind the flank.

A stop ridge can be provided on an outside of the peripheral wall of the mounting base, which, by lying against the outside of the housing, establishes a stop position for insertion of the light module. In order to achieve the mentioned flushness or offset of the bottom into the housing interior, the part of the housing against which the stop ridge lies can be a recess in the internal flank of the housing facing a washing area of the vehicle treatment installation.

A mounting slit can be provided between the stop ridge and the outside of the housing, into which a tool, especially a screwdriver, can be introduced and turned or moved in another suitable manner in order to force the mounting base out of the housing when a light module must be replaced.

An elastically compressible element should be provided between the stop ridge and the outside of the housing. This elastically compressible element can, but need not, be a seal; its function can also be restricted to holding a seal forced against the housing provided on another location between the mounting base and the housing because of its elastic stress.

The mounting base is preferably injection-molded in one piece. Tightness of all surfaces of the light module exposed in the installed state and protection of the light source from penetrating moisture are thus ensured cost-effectively.

Consequently, the peripheral wall in a preferred embodiment is provided with external threads, and a union nut screwed onto the external threads lies against the inside of the housing, in which case it holds the compressible element sufficiently compressed so that it can act as a seal.

In order to be able to loosen the union nut in this embodiment, the housing should be releasable from a bottom of the vehicle treatment installation to which it is normally fastened, so that access to the union nut in the interior is possible via an open bottom of the housing.

The peripheral wall in a second preferred embodiment is consequently provided with a peripheral groove on its outside and a clamp lying against the inside of the housing secures the mounting base on the housing by engaging in the groove on at least two opposite locations. Here again the clamp can hold the compressible element in a sealing, compressed state. Access to the interior of the housing is required for introduction of the clamp into the groove or for its loosening.

According to a particularly preferred third embodiment, the peripheral wall has an O-ring that is elastically deformed in contact with the inside of the housing.

This O-ring can be in contact with a sharp edge of the housing that delimits the opening accommodating the light modules. Even if the O-ring in the installed state has a greater diameter than the opening and consequently locks it in positive-locking fashion in the housing in normal operation of the mounting base, disassembly of the light module is possible without access to the interior of the housing, since by exerting a sufficiently large tensile force on the mounting base, especially by means of a tool introduced to the mounting slit, an edge of the O-ring protruding beyond the opening can be sheared off on the sharp edge. During disassembly of a light module its O-ring is destroyed, but it can simultaneously be ensured in this way that the O-rings are replaced before they become brittle and therefore ineffective due to age.

In order to facilitate introduction of the mounting base into the housing from the outside and at the same time ensure that the seal between the mounting base and the housing is clamped, the openings of the housing can be tapered into the housing interior.

As an additional means of protection against moisture the light source can be sealed in the mounting base.

Especially in the embodiments that require access to the interior of the housing to change a light module, the wheel guide rail should also include a base plate that tightly closes off an open bottom of the housing releasably. When the housing is removed from the bottom for replacement of the light module, the bottom plate can remain there. Problems during refastening on the bottom can thereby be avoided.

The openings and the mounting base can be provided with complementary codings that permit introduction of a mounting base into an opening only in a single orientation or a small number of discrete orientations.

This is especially useful when the light modules do not radiate isotropically around their optical axis but have a preferred direction and it is to be ensured that their light is well perceived by the driver of a vehicle when driving into the treatment installation.

The wheel guide rail described above and subsequently can preferably be used in a vehicle treatment installation described below.

The vehicle treatment installation mentioned in the introduction is characterized according to the invention by the fact that at least one of the wheel guide rails is designed as described above and subsequently. One of the wheel guide rails according to the invention can preferably be mounted on both sides of the washing area.

BRIEF DESCRIPTION OF THE DRAWINGS

Additional details and advantages of the invention are apparent from the following description of preferred embodiment examples with reference to the drawings. In the drawings:

FIG. 5 shows the light module from FIG. 3 partially in a side view, partially in an axial section;

FIG. 6 shows a cross section through the wheel guide rail with the light module mounted therein;

FIG. 7 shows a longitudinal section through the inner flank of the wheel guide rail and a light module mounted therein according to an alternative embodiment;

FIG. 8 shows a radial section through the light module from FIG. 7;

FIG. 9 shows a light module according to another alternative embodiment.

DETAILED DESCRIPTION OF THE INVENTION

Figure 1:
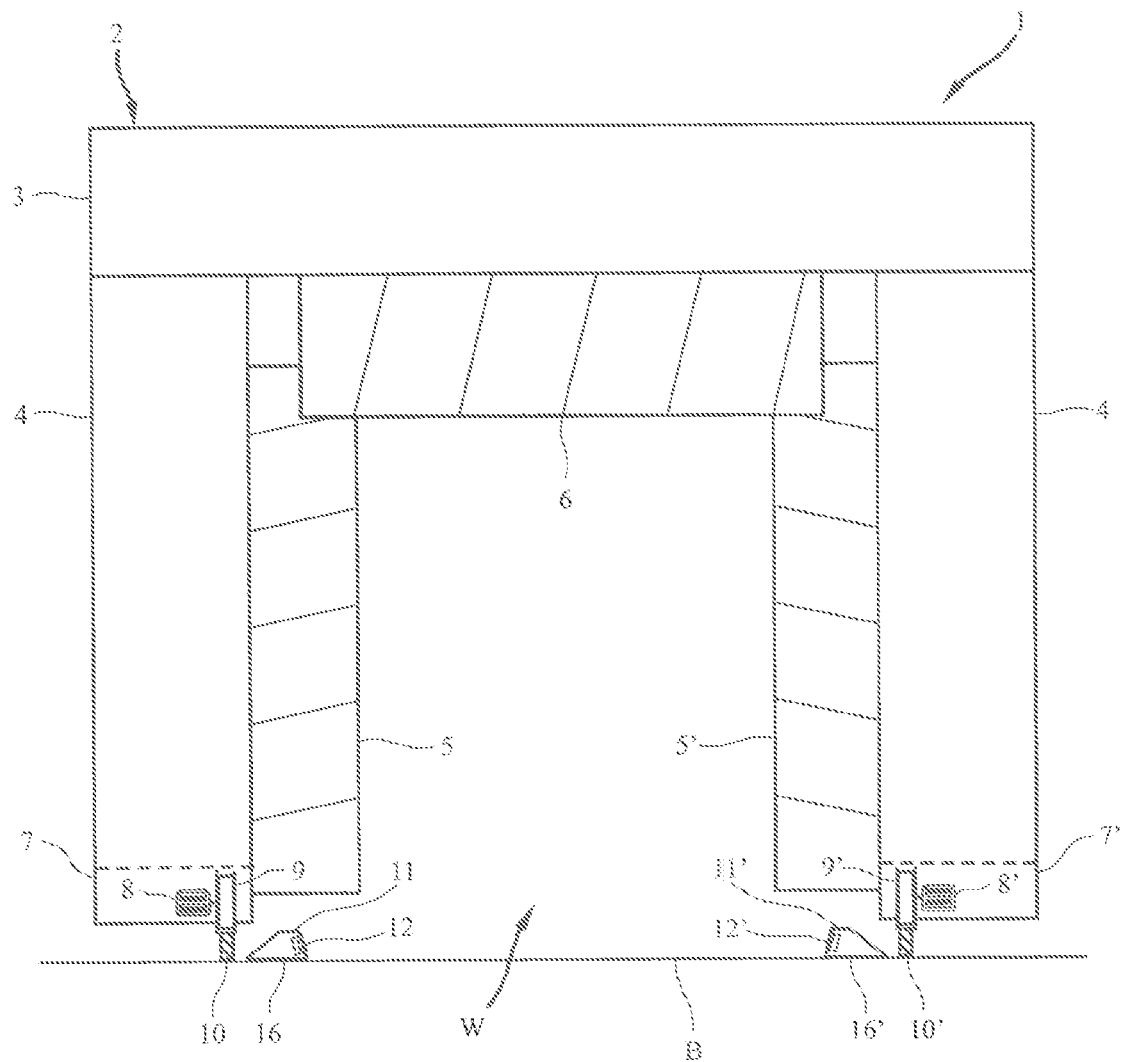
FIG. 1 shows a schematic partially cutaway front view of a vehicle treatment installation according to the invention with a wheel guide rail according to the invention.

FIG. 1 shows a schematic front view of a vehicle treatment installation according to the invention in the form of rollover carwash installation 1 with a rollover wash unit 2. The rollover wash unit 2 has two essentially upright portal columns 4, 4' connected to each other by a portal cross arm 3. Vertical side washing brushes 5, 5' and the horizontal roof washing brush 6 are arranged on the rollover wash unit 2, which are also simply referred to subsequently as washing brushes.

The rollover wash unit 2 can be moved in a longitudinal direction L of the rollover carwash installation 1 in order to treat a vehicle F in a washing area W between the portal columns 4, 4', especially to wash, polish and dry it. The ideal travel direction of vehicle F then essentially runs parallel to longitudinal direction L.

Since the portal columns 4, 4' are designed essentially identically, the invention is subsequently explained with reference to the left portal column 4 in FIG. 1. Corresponding variants also apply to the right portal column 4' in FIG. 1, in which the parts there are designated with the same reference numerals as the corresponding parts on the left side, with an added apostrophe.

The lower end of the portal column 4 has a driving foot 7 in which a driving roller 9 is mounted to rotate and can be motor-driven with a drive 8. The driving roller 9 runs on a driving rail 10 fastened on a bottom B of the rollover carwash installation 1.

The rollover carwash installation 1 in the version described above is known in itself and therefore requires no further explanation.

For lateral delimitation of the washing area W between the driving rails 10, 10', identically formed wheel guide rails 11, 11' arranged in mirror image fashion are mounted on bottom B. The wheel guide rails 11, 11' then serve to guide the wheels of an entering vehicle and as a signal to the driver that the washing area W ends here laterally.

Since the wheel guide rails 11, 11' are designed identically and are mounted in a mirror image, the invention is explained below with reference to the left wheel guide rail 11 in FIG. 1. Corresponding versions also apply for the right wheel guide rail 11' in FIG. 1.

Figure 2:
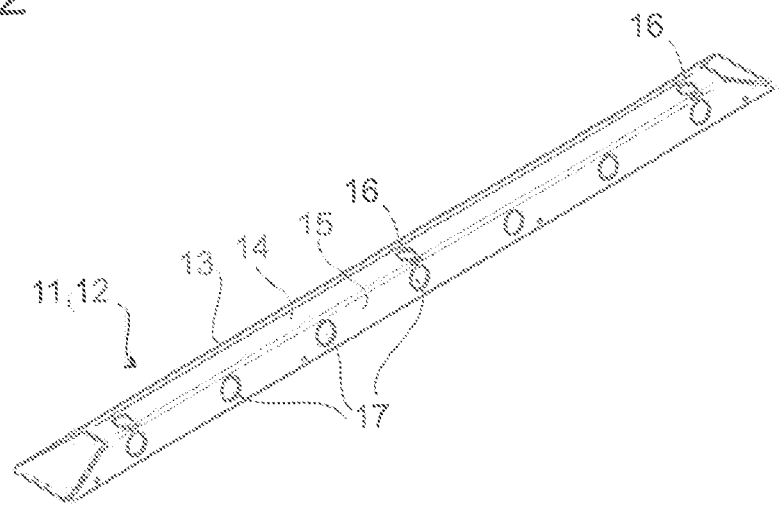
FIG. 2 shows a perspective view of a wheel guide rail from FIG. 1.

FIG. 2 shows the left wheel guide rail 11 in a perspective view. An elongated housing 12 made of stainless steel or other material insensitive to the liquids used during treatment of vehicles has a trapezoidal cross section, in which case an outer flank 13 arranged on the side facing away from washing area W is less strongly sloped than an inner flank 15 facing the washing area W and therefore the vehicle. A horizontal crown surface 14 extends between flanks 13 and 15. Screw holes 16 in the upper surface 14 are provided in order to accommodate screws (not shown) that anchor the housing 12 directly or indirectly on the bottom B of the rollover carwash installation 1.

The wheel guide rail 11 has a number of identically designed openings 17 on its inside flank 15. One light module 18 each is arranged in the opening 17 whose structure and function are presented and explained in detail below with reference to FIGS. 3 to 9.

Figure 3:
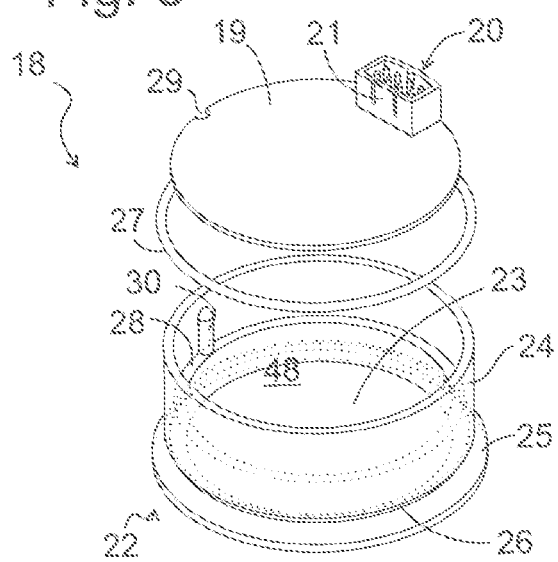
FIG. 3 shows a separated view of a light module according to one embodiment of the invention.

FIG. 3 shows a light module 18 in a separated perspective view. Light sources as well as an integrated switching component for their control are situated on the front (not visible) of a circuit board 19 in the perspective view of FIG. 3. The visible back carries a plug 20, via which the light source and the switching component are supplied with operating voltage and control commands via a bus (not shown) guided in housing 12. The bus can be constructed as a wiring harness from which connections for the individual light modules 18 branch off. As an alternative, two plugs could also be provided on each light module 18 in order to connect it to the light modules 18 adjacent in different directions via cables guided in housing 12 and thus daisy-chain the operating voltage and control commands over the entire length of the wheel guide rail 11.

The bus uses any protocol appropriate for use in an environment subject to disturbances, especially CAN, for transmission of control commands. The control commands individually control the switching-on and switching-off of the light sources for each light module in order to suggest certain maneuvers to the driver of the vehicle entering the installation through light signals, for example, blinking, stop or go lights. If the light modules 18 contain light sources in different colors, information can also be conveyed to the driver by controlling the color of the emitted light.

The plug 20 has an elastic tongue 21 which can be locked in positive-locking fashion to an introduced complementary plug of the wiring harness in order to rule out unintended loosening of the plugs from each other. Its asymmetric shape permits connection to the complementary plug only in a single orientation so that incorrect connection is ruled out.

A mounting base 22 injection-molded in one piece from transparent plastic includes a bottom 23, a peripheral wall 24 in tubular shape around bottom 23 and a stop ridge 25 extending around wall 24. A groove 26 runs around the outside of wall 24, which is provided to accommodate a seal 27. A recess 48 delimited by the bottom 23 and wall 24 is provided in order to accommodate the circuit board 19 with the light sources facing bottom 23; a shoulder 28 on the inside of wall 24 establishes the installation depth of the circuit board 19. The orientation of circuit board 19 is clearly established by a notch 29, into which a rib 30 of mounting base 22 engages in the installed position.

Figure 4:
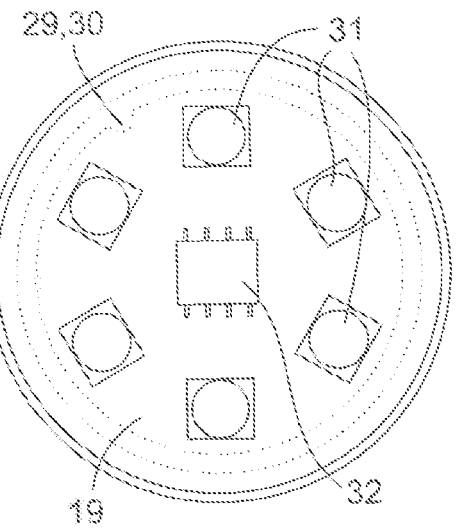
FIG. 4 shows a top view of the light module from FIG. 3.

FIG. 4 shows a top view of the assembled light module 18. The circuit board 19 with the light sources mounted on it, preferably LEDs 31, and the control component 32 are apparent through the transparent bottom 23. The LEDs 31 are mounted here with optical axis normal to circuit board 19 for the sake of simplicity, so that they also emit mostly in the direction of this axis; prisms can be formed on bottom 23, preferably on its interior facing circuit board 19 in order to deflect their light in the direction of a vehicle entering the carwash installation 1.

FIG. 5 shows the light module 18 partially in a side view, partially in section. The O-ring 27 protrudes radially from groove 26; it is secured in groove 26 in the axial direction. A compressible element, here in the form of a ring 33 made of foam, is glued onto the inside facing the O-ring 27. A mounting slit 34 is recessed on a short peripheral section of the stop ridge 25.

FIG. 6 shows the wheel guide rail 11 with the light module 18 mounted in housing 12 in cross section. The edges of opening 17 form a cone that tapers into the interior of housing 12. A sharp edge 35 on the edge of the opening is pressed into O-ring 27 in order to produce watertight contact around the mounting base 22. During first assembly, before installation of the wheel guide rail 11 on the bottom of washing installation 1, the mounting base 22 can be pushed into housing 12 without O-ring 27 until groove 26 has completely passed edge 35 and ring 33 is pressed flat between the stop ridge 25 and flank 15; the O-ring 27 can then be pushed from the inside onto wall 24 and snapped into groove 26.

The wheel guide rail 11 can be mounted in the carwash installation 1 by fastening the housing with screws engaging directly in the bottom anchor through screw opening 16. These screws need not be loosened again for later replacement of light modules 18, since in order to loosen a light module again, a tool 36, for example, a screwdriver, can be introduced between the edge of opening 17 and the stop ridge 25 into the mounting slit 34 and the mounting base 22 driven out from opening 17 by turning tool 36, in which case the protruding part of O-ring 27 is sheared off along the sharp edge 35. The plug of the wiring harness anchored in positive-locking fashion to it is also pulled out together with the light module 18. However, since tongue 21 is now exposed, positive locking between the plugs is eliminated and the plug 20 of a new light module 18 can be connected to the wiring harness.

The new light module 18 is then forced in together with its O-ring 27 from the outside into opening 17 until O-ring 27 has passed edge 35 and is snapped against the inside of the housing behind edge 34. When the light module 18 is loosened, the tension of ring 33 ensures that the edge 35 is forced into O-ring 27.

FIG. 7 shows an alternative type of anchoring of light module 18 by means a section in the longitudinal direction of the wheel guide rail through its inside flank 15. The light module 18 is essentially identical to that described in FIGS. 3 to 6; it only lacks the O-ring in groove 26; instead, the compressible element between the stop ridge 25 and the inner flank 15 is designed as O-ring 37 made of nonporous material. When the light module 18 has been forced into the opening 17 far enough that the groove 26 lies completely behind edge 35, a clamp 38, depicted in a top view in FIG. 8, is pushed against the inside of flank 15 from the side against light module 18, so that the arms 39 of clamp 38 engage in groove 26 on opposite sides of the mounting base 12 and, by simultaneously lying against the inside of flank 15, are locked in the light module in opening 17.

In this embodiment, during replacement of a light module 18, it is necessary to remove the housing 12 from the bottom in order to be able to access the clamp 38 via its then open bottom.

In order to facilitate reinstallation of the housing on the bottom, as shown in FIG. 6, a base plate 40 is provided, which can be made from the same steel sheet as housing 12. Nuts 41 complementary to screw hole 16 are arranged on base plate 40, so that the housing 12 can be fastened on the bottom directly via screws 42 engaging in nuts 41. Anchoring of the base plate 40 on the bottom need not be loosened. The screws 42 clamp a seal 43 between base plate 40 and housing 12 that extends around the open bottom of the housing. In order to facilitate positioning of seal 43, the base plate 40 can have a flat protrusion 44, which engages in the open bottom of the housing in the installed state and whose edges mark the installation position of seal 43.

It is further apparent from FIG. 8 that an outwardly protruding rib 45 engages in a notch 46 of flank 15 on an outside of the peripheral wall 24 complementary to the inward directed rib 30. This ensures that the light module 18 can only be installed in a single axial orientation. Two different objectives can be pursued with this measure. In the first place, as already discussed, an emission direction of the light module deviating from the surface normal lines of flank 15 can be clearly established; in the second place, a plug complementary to plug 20 can also be arranged fixed on the sides of housing 12 and engagement ensures that the light module 18 can only be introduced to opening 17 in one orientation in which the plugs correctly match each other.

In the embodiment of FIG. 9, the mounting base 12 is provided on the outside of wall 24 with screw threads and is fastened in opening 17 by means of a union nut 47 screwed on from the housing interior. An O-ring 37 can optionally be clamped between the stop ridge 25 and the outside of flank 15 or between its inside and the union nut 47. Here again, replacement of a light module 18 requires that the interior of housing 11 be accessed and, for this purpose, removed from bottom B.

The invention claimed is:

1. A wheel guide rail for lateral delimitation of a washing area of a vehicle treatment installation with an elongated housing and a plurality of light modules distributed along the housing, wherein the housing has a plurality of openings distributed over a length of the housing, and wherein each light module includes a mounting base mounted in one of the openings of the housing and at least one light source mounted in the mounting base.

2. The wheel guide rail according to claim 1, wherein the mounting base includes a bottom and a peripheral wall, which delimit a recess open to an inside of the housing in which the at least one light source is accommodated, and wherein the bottom is transparent to light of the at least one light source.

3. The wheel guide rail according to claim 2, wherein the bottom is flush with one flank of the housing in which the openings are formed, or the bottom is recessed into the housing behind the one flank of the housing.

4. The wheel guide rail according to claim 2, wherein a stop ridge is provided on an outside of the peripheral wall, which lies against an outside of the housing.

5. The wheel guide rail according to claim 4, wherein a mounting slit is provided between the stop ridge and the outside of the housing for introduction of a tool, especially a screwdriver.

6. The wheel guide rail according to claim 4, wherein an elastically compressible element is provided between the stop ridge and the outside of the housing.

7. The wheel guide rail according to claim 2, wherein the mounting base is injected-molded in one piece.

8. The wheel guide rail according to claim 2, wherein the peripheral wall is provided with external threads and a union nut screwed onto the external threads lies against the inside of the housing.

9. The wheel guide rail according to claim 2, wherein the peripheral wall is provided with a peripheral groove on ifs an outside of the peripheral wall and a clamp lying against the inside of the housing engages into the groove on at least two opposite sites.

10. The wheel guide rail according to claim 2, wherein the peripheral wall carries an O-ring, which is elastically deformed in contact with the inside of the housing.

11. The wheel guide rail according to claim 10, wherein the O-ring is in contact with a sharp edge of the housing that delimits the opening accommodating the light module.

12. The wheel guide rail according to claim 1, wherein the openings of the housing are tapered into the housing interior.

13. The wheel guide rail according to claim 1, wherein the light source is cast into the mounting base.

14. The wheel guide rail according to claim 1, further comprising a base plate that tightly closes off an open bottom of the housing in releasable fashion.

15. The wheel guide rail according to claim 1, wherein the light modules are provided with plugs for power supply and/or control of the at least one light source and plugs complementary to the plugs of the light modules are movable on sides of the housing and preferably removable from the openings.

16. A vehicle treatment installation, wherein a treatment area is delimited laterally by the vehicle guide rail according to claim 1.

17. A wheel guide rail for lateral delimitation of a washing area of a vehicle treatment installation with an elongated housing and a plurality of light modules distributed along the housing,
wherein the housing has a plurality of openings distributed over a length of the housing,
wherein each light module includes a mounting base mounted in one of the openings of the housing and at least one light source mounted in the mounting base,
wherein the mounting base includes a bottom and a peripheral wall, which delimit a recess open to an inside of the housing in which the at least one light source is accommodated,
wherein the bottom is transparent to light of the at least one light source, and
wherein a stop ridge is provided on an outside of the peripheral wall, which lies against an outside of the housing.

18. The wheel guide rail according to claim 17, wherein a mounting slit is provided between the stop ridge and the outside of the housing for introduction of a tool, especially a screwdriver.

19. The wheel guide rail according to claim 17, wherein an elastically compressible element is provided between the stop ridge and the outside of the housing.

20. A wheel guide rail for lateral delimitation of a washing area of a vehicle treatment installation with an elongated housing and a plurality of light modules distributed along the housing,
wherein the housing has a plurality of openings distributed over a length of the housing,
wherein each light module includes a mounting base mounted in one of the openings of the housing and at least one light source mounted in the mounting base,
wherein the mounting base includes a bottom and a peripheral wall, which delimit a recess open to an inside of the housing in which the at least one light source is accommodated,
wherein the bottom is transparent to light of the at least one light source, and
wherein the peripheral wall carries an O-ring, which is elastically deformed in contact with the inside of the housing.

* * * * *